United States Patent

Sladek et al.

[15] 3,638,429
[45] Feb. 1, 1972

[54] APPARATUS FOR CONFINING MATERIAL FLOATING ON WATER

[72] Inventors: Theodore E. Sladek, La Mesa; John E. Palmer, Santa Ana; Michael F. Steele, Costa Mesa, all of Calif.

[73] Assignee: The Susquehanna Corporation, Fairfax, Va.

[22] Filed: May 18, 1970

[21] Appl. No.: 38,111

[52] U.S. Cl. ............................................................. 61/1 F
[51] Int. Cl. ....................................................... E02b 15/04
[58] Field of Search .................. 61/1 F, 5; 210/DIG. 21, 242; 114/.5 T

[56] References Cited

UNITED STATES PATENTS

| 3,567,019 | 3/1971 | Headrick | 61/1 F |
| 3,503,214 | 3/1970 | Desty et al. | 61/1 F |

*Primary Examiner*—Peter M. Caun
*Attorney*—Martha L. Ross

[57] ABSTRACT

Apparatus for confining material floating on water, comprising a floating barrier having upper and lower pivotally connected sections. The upper section is buoyant and thus seeks the water surface, and the lower section is of neutral buoyancy so as to provide ballast and to remain below the surface of the water. A restraint strap is connected to the upper and lower sections to limit the relative movement therebetween. In operation, when there is an upward movement of the water surface, the upper section pivots upwardly to seek the water surface and the lower section remains below the water surface, thereby preventing the floating material from moving over or under the barrier. The restraint strap limits the movement of the upper section from a substantially horizontal position adjacent the lower section to a substantially vertical position when subjected to wave motion.

8 Claims, 4 Drawing Figures

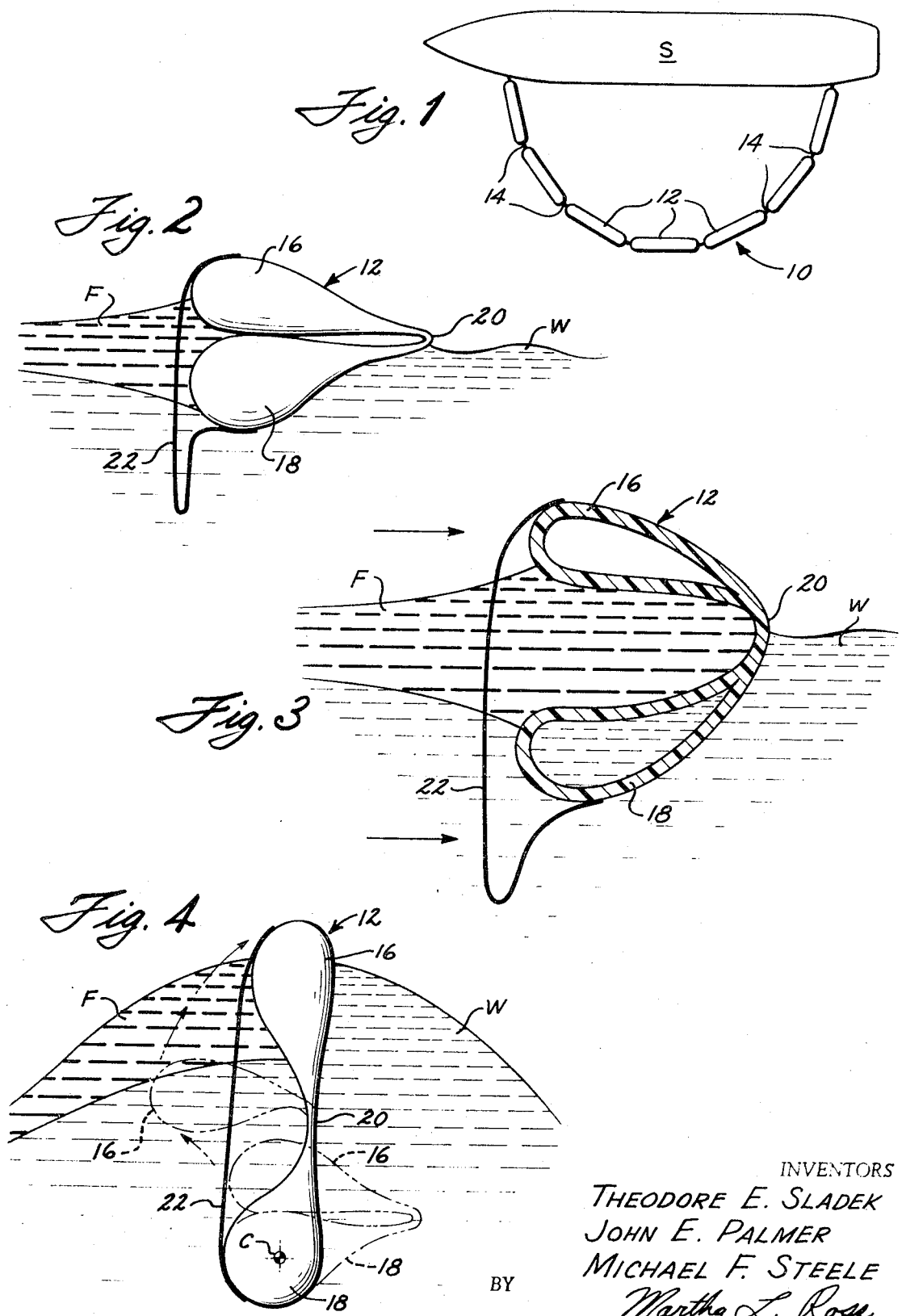

APPARATUS FOR CONFINING MATERIAL FLOATING ON WATER

BACKGROUND OF THE INVENTION

The present invention relates to apparatus for confining material floating on water and, more particularly, to such apparatus which effectively confines the floating material when subjected to gradual or sudden changes in the level of the water surface.

One of the most effective means of confining material, such as oil spills, floating on water is through the use of floating segments that are linked together to form a peripheral barrier. These basic structures have been fabricated from logs, oil drums, inflated firehoses, and many other forms of floating structures. Though the floating barrier confinement technique has been successful under certain conditions, most of the systems used or proposed have been unsatisfactory in open seas or rough water where wave action carries the floating material over or under the barrier, and the barriers tend to break apart under severe stresses imposed by the open sea.

A floating barrier or boom, in calm water with no substantial current flow, can contain floating material such as an oil slick if the barrier extends below the level of the floating material. In the open sea, however, the material can be driven to flow beneath the barrier by the forces of wind and current. The material is carried below the barrier at the boundary layer between the material and the water. In view of the deficiencies of the prior art barriers, a need has arisen for a floating barrier that is capable of confining a floating material such as oil within a predetermined area on a water surface when subjected to the forces of wind and current in the open sea.

SUMMARY OF THE INVENTION

The apparatus of the present invention provides a floating barrier for the confining of floating materials, such as oil spills, which utilizes a plurality of floating segments that are linked together and disposed in surrounding relation to the floating material.

Each of the floating segments comprises upper and lower pivotally connected sections which may be formed to flexible or rigid material. The upper section is buoyant and thus floats at the surface of the water, and the lower section is of neutral buoyancy to provide ballast and to remain below the surface of the water. A flexible restraint strap is secured to the upper and lower sections to limit relative movement therebetween.

In the operation of the present invention, the lower section, being of neutral buoyancy, remains below the surface of the water when the floating barrier segment is subjected to wave or current action. The upper section pivots upwardly to seek the wave surface and thus separates from the lower section to enhance the containment ability of the floating segment. The restraint strap limits the movement of the upper section from a substantially horizontal position adjacent the lower section to a substantially vertical position when subjected to wave action. It will be readily seen, therefore, that the confined floating material will be prevented from moving over or under the floating segment even when it is subject to wave or current action.

BRIEF DESCRIPTION OF THE DRAWINGS

FIG. 1 is a schematic plan view of a barrier for confining floating material utilizing a plurality of floating segments constructed in accordance with the principles of the present invention;

FIG. 2 is a side elevational view of a floating barrier segment of the present invention, showing the configuration and condition of the segment when it is floating in calm water;

FIG. 3 is a view similar to FIG. 2 showing the floating segment when it is subjected to current action; and FIG. 4 is a view similar to FIGS. 2 and 3, showing the floating segment when it is subjected to wave action.

DESCRIPTION OF THE PREFERRED EMBODIMENT

As shown in FIG. 1, the floating material barrier 10 of the present invention preferably comprises a plurality of floating segments 12 which may be of any suitable size or exterior shape. The floating segments 12 preferably are removably connected at their ends by flexible strips 14 that are of sufficient height and in sealing engagement with the floating segments to prevent the escape of the confined floating material between the segments. The floating barrier 10 could be deployed from and attached to a ship S having apparatus for collecting the floating material, in the manner shown in FIG. 1 or in any other suitable manner. For example, the barrier 10 could be arranged in circular fashion and anchored by any suitable type of anchoring means, such as buoys or anchors; or could be secured to mooring means on a shoreline or a dock or the like. Also, the barrier 10 could be of unitary construction rather than being segmented.

Referring to FIG. 2, each of the floating barrier segments 12 comprises an upper section 16 and a lower section 18 that are pivotally connected by a flexible hinge 20 which may be formed integrally with the sections 16 and 18 or may be in the form of a separate member connected thereto. The hinge 20 is provided at the outer sides of the sections 16 and 20, and a flexible restraint strap 22 is secured at its ends to the inner sides of the sections 16 and 18 for a purpose to be described hereinafter.

In accordance with the present invention, the upper section 16 is formed so as to be buoyant, and the lower section 18 is formed so as to be of substantially neutral buoyancy. The sections 16 and 18 may be formed of any suitable flexible or rigid material, and may be of solid or hollow construction, without departing from the scope of this invention. Preferably, the upper and lower sections 16 and 18 are formed of a flexible material and are of hollow inflatable construction as shown in FIG. 3.

As an illustrative example, the upper section 16, the hinge 20 and the lower section 18 could be integrally formed of a watertight fabric-type material such as a vinyl-coated polyester yarn which has good structural properties. The restraint strap 22 may be formed of the same material or of any other suitable flexible material. The flexible and hollow construction of the sections 16 and 18 is advantageous in that it enables them to be stored in deflated condition in a minimum of space, to be deployed in a deflated condition, and thereafter to be inflated in any suitable or conventional manner.

Preferably, the upper pillow 16 is inflated with air by any suitable means (not shown) so as to be buoyant, and the lower section 18 is filled with water by any suitable means (not shown) so as to be of substantially neutral buoyancy. If the sections 16 and 18 are of solid construction, they may be formed of any suitable buoyant material such as a foamed plastic and, in such a case, the lower section 18 would be provided with suitable ballast so as to be of neutral buoyancy.

As shown in FIG. 2, when the water surface W is relatively stable during calm conditions, the sections 16 and 18 are disposed in folded condition wherein the upper section 16 is immediately above the lower section 18, and the sections 16 and 18 extend in a substantially horizontal direction. At their inner free sides, the sections 16 and 18 engage the floating material F, such as an oil spill, to be confined. The upper section 16 extends above the upper surface of the floating material F and the lower section 18 extends below the lower surface of the floating material to prevent it from escaping past the floating barrier segment 12.

Referring to FIG. 3, when the barrier segment 12 is subjected to current or wind forces in the direction shown by the arrows in FIG. 3, the upper section 16, because of its buoyancy, pivots upwardly to follow the rising level of the floating material F and separates from the lower section 18 which remains in its normal position below the water surface because of its neutral buoyancy. In view of the spacing between the upper and lower sections 16 and 18, they are able to contain and trap therebetween the increased accumulation of floating material F caused by the wind or current forces. It will be seen, therefore, that the floating barrier segment 12 of the present invention readily and automatically adjusts to wind and current forces to prevent the escape of any floating material F over or under it.

When the floating barrier segment 12 is subjected to a sudden rise in water level caused by wave action, as shown in FIG. 4, the buoyant upper section 16 moves from the broken line positions shown in FIG. 4 to the solid line position shown therein wherein it is disposed in a substantially vertically extending position. The lower section 18, because of its neutral buoyancy, remains at substantially the same level below the water surface and pivots about its center of gravity C from the broken line position to the solid line position shown in FIG. 4 wherein it is disposed in a substantially vertically extending position in alignment with the upper section 16. In this condition, the restraining strap 22 is tensioned to prevent the upper section 16 from moving (in a clockwise direction as shown in FIG. 4) beyond the vertical position. The spacing between the upper and lower sections 16 and 18 is thus greatly increased to confine the floating material F and to effectively prevent it from flowing over or under the floating segment 12 during wave motion.

When the wave motion subsides, the upper and lower sections 16 and 18 will again move to the relative positions shown in FIGS. 2 or 3, depending on the calmness of the water surface W.

We claim:

1. Apparatus for confining material floating on water, comprising a floating barrier having an upper buoyant section adapted to float at the surface of the water, and a lower section of substantially neutral buoyancy adapted to be positioned below the surface of the water, and flexible hinge means for pivotally connecting said upper and lower sections, said upper and lower sections being normally substantially horizontally disposed in one position wherein said upper section overlies said lower section and being pivotally movable to another position wherein said upper and lower sections are substantially vertically disposed whereby wen subjected to an upward movement of the water surface said upper section pivots upwardly to seek the water surface and said lower section remains below the water surface, thereby to prevent the floating material from moving over or under said barrier, and means connected to said upper and lower sections for limiting the upward movement of said upper section relative to said lower section.

2. The apparatus of claim 1 wherein said limiting means comprises a flexible strap connected to said upper and lower sections.

3. The apparatus of claim 1 wherein said upper and lower sections comprise flexible hollow members.

4. The apparatus of claim 3 wherein said upper section is filled with a buoyant fluid, and said lower section is filled with water.

5. The apparatus of claim 1 wherein said flexible hinge portion is integrally formed with said upper and lower sections.

6. The apparatus of claim 1 wherein said connecting means is disposed on the side of said sections opposite to that adjacent the floating material.

7. The apparatus of claim 1 wherein said limiting means serves to prevent said upper section from moving beyond said substantially vertical position.

8. The apparatus of claim 3 wherein said upper and lower sections are formed of a vinyl-coated fabric.

* * * * *